(12) United States Patent
Mohamed

(10) Patent No.: US 6,899,748 B2
(45) Date of Patent: May 31, 2005

(54) METHOD AND APPARATUS FOR REMOVING CONTAMINANTS FROM GAS STREAMS

(76) Inventor: Moustafa Abdel Kader Mohamed, 4167 Hollandia Crt., Prince George, British Columbia (CA), V2N 4K9

( * ) Notice: Subject to any disclaimer, the term of this patent is extended or adjusted under 35 U.S.C. 154(b) by 0 days.

(21) Appl. No.: 10/856,282

(22) Filed: May 28, 2004

(65) Prior Publication Data

US 2004/0216607 A1 Nov. 4, 2004

Related U.S. Application Data

(62) Division of application No. 10/368,806, filed on Feb. 14, 2003, now Pat. No. 6,824,587.

(51) Int. Cl.[7] .............................. B03C 1/30; B03C 3/74
(52) U.S. Cl. ......................... 96/3; 96/23; 96/24; 96/29; 96/39; 96/51; 96/65; 96/94
(58) Field of Search ........................... 96/3, 20–24, 51, 96/80, 29, 39, 40, 94, 65, 98; 95/7, 28, 67, 73, 76–77; 210/695, 222, 223

(56) References Cited

U.S. PATENT DOCUMENTS

| | | | |
|---|---|---|---|
| 3,374,941 A | 3/1968 | Okress | 315/111.91 |
| 3,443,087 A | 5/1969 | Robieux et al. | 250/290 |
| 3,929,433 A | 12/1975 | Lucero | 95/28 |
| 3,973,926 A | 8/1976 | Levi | 95/28 |
| 4,093,430 A | 6/1978 | Schwab et al. | 96/27 |
| 4,110,086 A | 8/1978 | Schwab et al. | 95/75 |
| 4,670,026 A | 6/1987 | Hoenig | 95/73 |
| 4,726,814 A | 2/1988 | Weitman | 95/73 |
| 4,729,835 A | 3/1988 | McNeillie et al. | 210/759 |
| 5,071,622 A | 12/1991 | Dunson, Jr. | 422/5 |
| 5,112,216 A | 5/1992 | Tenn | 431/5 |
| 5,137,687 A | 8/1992 | Dunson, Jr. | 422/5 |
| 5,492,677 A | 2/1996 | Yoshikawa | 422/174 |
| 5,597,403 A | 1/1997 | Hankins | 96/23 |
| 5,735,937 A | 4/1998 | Dingfelder | 95/28 |
| 5,736,032 A | 4/1998 | Cox et al. | 424/76.5 |
| 6,030,494 A | 2/2000 | Hupa et al. | 162/51 |
| 6,096,220 A * | 8/2000 | Ohkawa | 210/695 |
| 6,149,713 A | 11/2000 | Ochi et al. | 95/28 |
| 6,251,281 B1 | 6/2001 | Ohkawa | 210/695 |
| 6,515,281 B1 | 2/2003 | Ohkawa | 250/291 |
| 6,632,369 B2 * | 10/2003 | Cluggish et al. | 210/695 |
| 6,824,587 B2 * | 11/2004 | Mohamed | 95/7 |

FOREIGN PATENT DOCUMENTS

| | | | | |
|---|---|---|---|---|
| CA | 2356702 | * | 3/2003 | 96/3 |
| JP | 56-40424 | | 4/1981 | 96/3 |
| JP | 62-247823 | | 10/1987 | 96/3 |

OTHER PUBLICATIONS

References are applicant's prior patents cited in either the specification or declaration.*

Fundamentals of optics and Modern Physics, Hugh D. Young, McGraw–Hill Book Company, 1968, P.157 160.

* cited by examiner

Primary Examiner—Richard L. Chiesa
(74) Attorney, Agent, or Firm—Davis & Bujold, P.L.L.C.

(57) ABSTRACT

A method and apparatus for removing contaminants from gas streams. A first step involves selecting a contaminant to be removed from a gas stream and determining a characteristic ionizing energy value required to selectively ionize the selected contaminant with minimal effect on other contaminants in the gas stream. A second step involves applying the characteristic ionizing energy value to the gas stream and selectively ionizing the selected contaminant. A third step involves capturing the selected contaminant after ionization.

8 Claims, 4 Drawing Sheets

METHOD AND APPARATUS FOR REMOVING CONTAMINANTS FROM GAS STREAMS

This application is a divisional of U.S. Ser. No. 10/368,806 filed Feb. 14, 2003 and now U.S. Pat. No. 6,824,587.

FIELD OF THE INVENTION

The present invention relates to a method and an apparatus for removing contaminants from gas streams and, in particular, fine particle sulphur compounds emissions from exhaust gases.

BACKGROUND OF THE INVENTION

U.S. Pat. Nos. 4,093,430 and 4,110,086 (collectively the Schwab et al references) disclose a method for removing contaminants from exhaust gas streams and, in particular, fine particle emissions. The Schwab et al reference teaches that exposing the exhaust gases to a high energy, extremely dense electrostatic field serves to charge contaminants in the exhaust gas stream, which can then be collected. Water was introduced into the exhaust gas stream as an added wet scrubbing medium to assist with collection of contaminants. The Schwab et al references reported collection efficiency of approximately 95% of 0.5 micron sized contaminants and 97.5% of 1.25 micron sized contaminants. At these efficiency levels the system consumed about 6 gpm/1000 acfm of water, 150 watts/1000 acfm charging unit power and experienced 6 inches of water pressure drop.

Although the teachings of the Schwab et al references demonstrate promising results in terms of the ability to capture a high percentage of fine particulate emissions, the energy costs in doing so are unacceptably high.

SUMMARY OF THE INVENTION

What is required is a more energy efficient method for removing contaminants from gas streams.

According to one aspect of the present invention there is provided a method for removing contaminants from gas streams. A first step involves selecting a contaminant to be removed from a gas stream and determining a characteristic ionizing energy value required to selectively ionize the selected contaminant with minimal effect on other contaminants in the gas stream. A second step involves applying the characteristic ionizing energy value to the gas stream and selectively ionizing the selected contaminant. A third step involves capturing the selected contaminant after ionization.

In contrast to the teaching of the Schwab et al references which attempted to capture over 95% of all particulate contaminants, the present method is to select a contaminant and to the extent possible with present technologies ionize only the selected contaminant with minimal effect on other contaminants. This technique is particularly effective with contaminants, such as sulphur compounds, which cause unpleasant smells in emissions but constitute only a very small percentage of total emissions. Where multiple contaminants are to be removed, the teachings of the present method can be performed sequentially in stages, removing one of the selected contaminants at each stage. As only a small fraction of the contaminants are effected, the cost of implementing this type of system is a fraction of the cost of implementing the teachings of the Schwab et al references.

According to another aspect of the present invention there is provided an apparatus for removing contaminants from gas streams which includes an ionization assembly and a tuner for selectively tuning the ionization assembly to produce an electric field having a characteristic ionizing energy value required to selectively ionize a selected contaminant with minimal effect on other contaminants in a gas stream. A collector is then provided for capturing the selected contaminant after ionization.

There are a variety of further enhancements which can be added to further enhance the beneficial results obtained through the use of both the described method and apparatus.

Even more beneficial results may be obtained when the selected contaminant is captured after ionization by applying a magnetic field which directs the selected contaminant to the collector.

Even more beneficial results may be obtained when the magnetic field is applied at an angle to the motion of the selected contaminant to deflect the selected contaminant along an arcuate path to the collector which can be predetermined based upon known data regarding mass and average drift velocity of the selected contaminant.

Even more beneficial results may be obtained when the collector is charged with an electric charge having a different polarity to that of the ionized selected contaminant, whereby the selected contaminant is attracted to the collector.

Even more beneficial results may be obtained when the collector includes a charged metal substrate cooled below a characteristic liquifying temperature for the selected contaminant, thereby liquifying the selected contaminant.

Even more beneficial results may be obtained when the charged metal substrate is positioned at an angle, with a collection vessel positioned beneath the charged metal substrate, such that after liquefaction the selected contaminant flows down the charged metal substrate into the collection vessel.

A preferred configuration for the ionization assembly includes a first body having a first set of conductive members and a second body having a second set conductive members. The first body and the second body are supported by and extending through openings in an insulated support in parallel spaced relation with the first set of conductive members intermeshed with the second set of conductive members.

Even more beneficial results may be obtained from the ionization assembly with means is provided to effect relative movement of the first body and the second body toward and away from each other. This serves to clean the first set of conductive members and the second set of conductive members by rubbing them against the insulated support. In the absence of periodic cleaning dust would start to accumulate. An accumulation of dust short circuits the ionization assembly so that it no longer functions and can lead to sparking.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
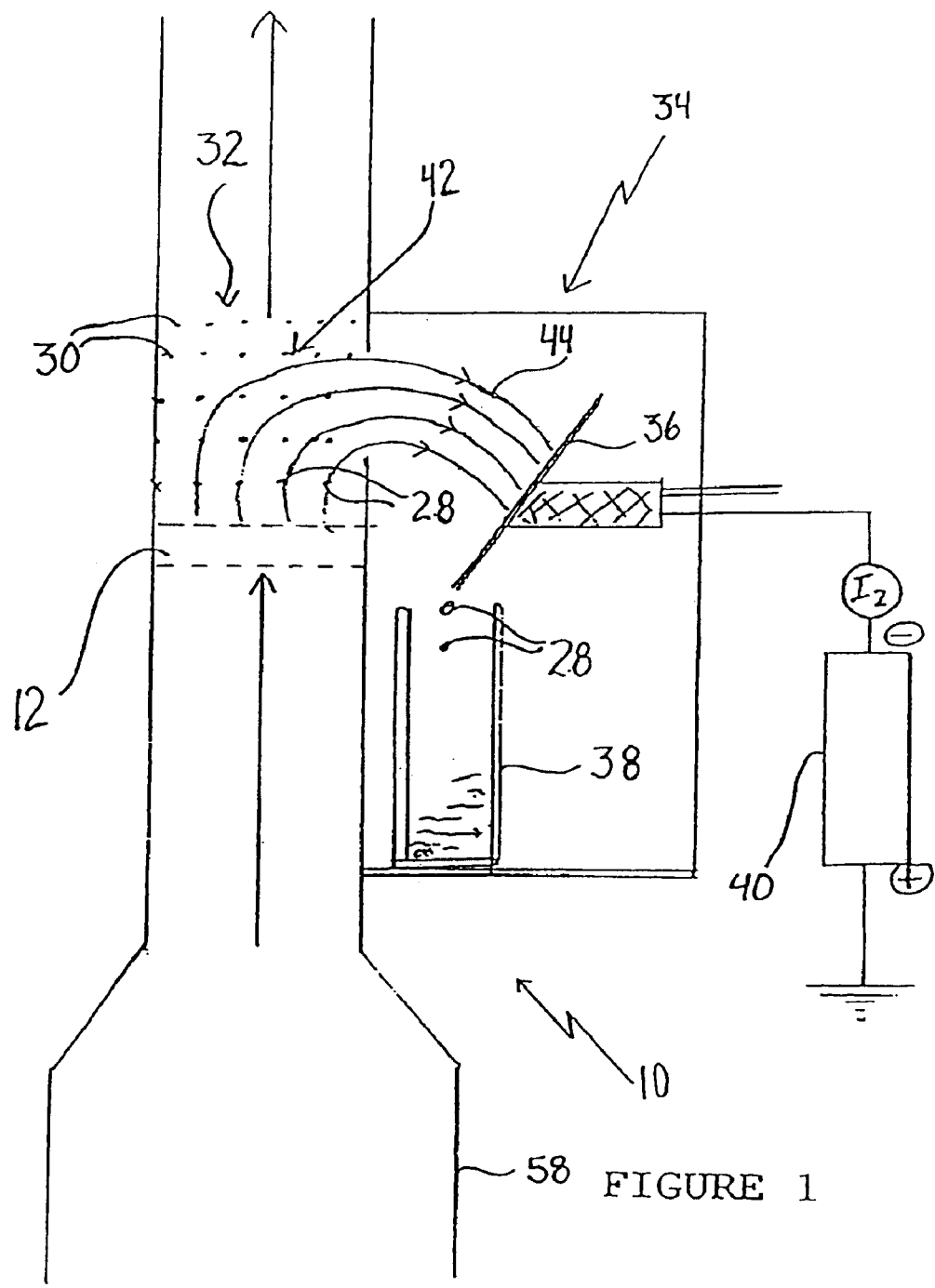
FIG. 1 is a side elevation view, in section, of an apparatus for removing contaminants from gas streams constructed in accordance with the teachings of the present invention.

The preferred embodiment, an apparatus for removing contaminants from gas streams generally identified by reference numeral 10, will now be described with reference to FIGS. 1 through 4.

Figure 3:
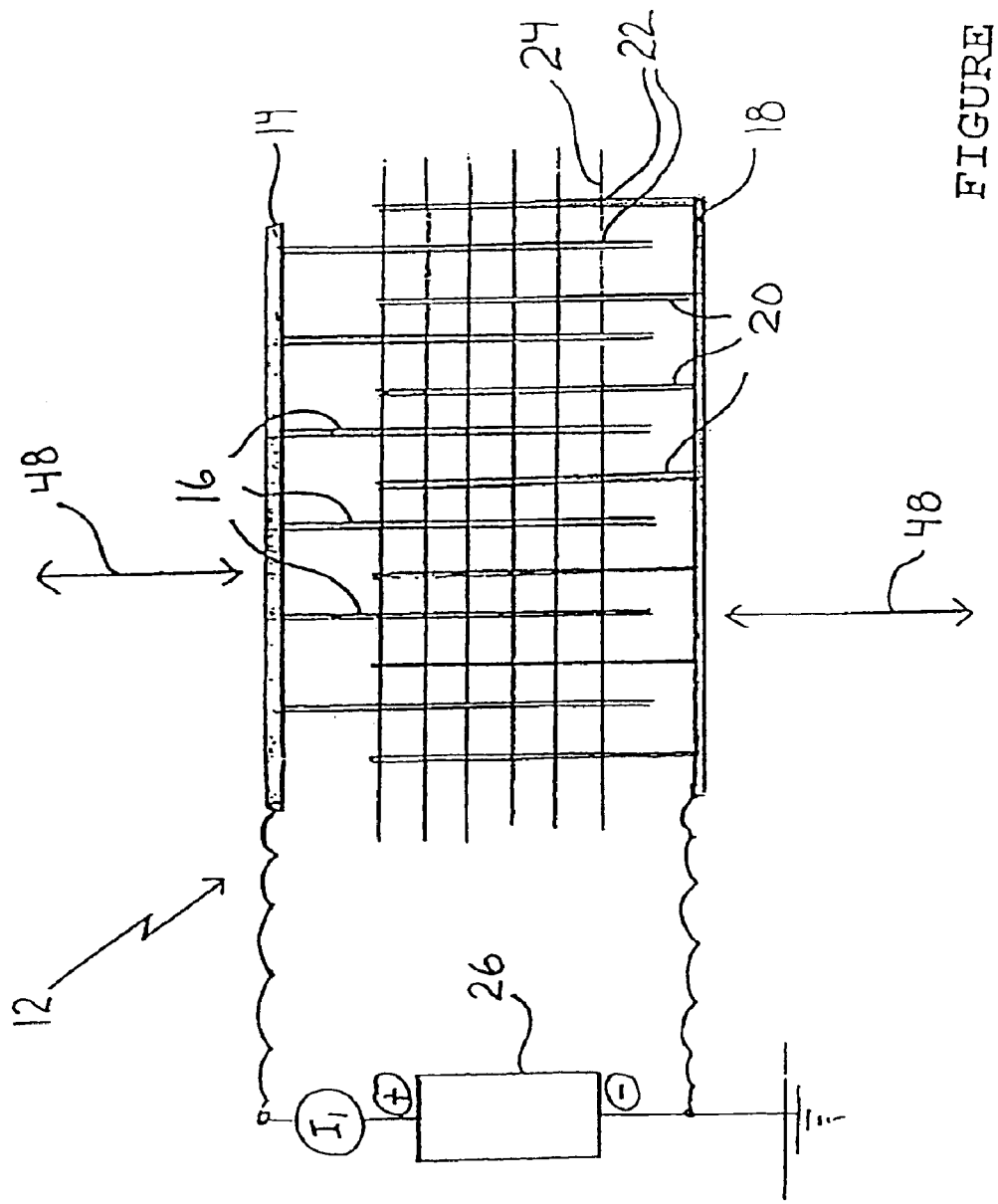
FIG. 3 is a top plan view, in section, of the ionization assembly illustrated in FIG. 2.

Structure and Relationship of Parts:

Referring to FIG. 1, apparatus 10 includes an ionization assembly 12. Referring to FIG. 3, ionization assembly 12 has a first body 14 with a first set of conductive members 16 and a second body 18 with a second set conductive members 20. First body 14 and second body 18 pass through openings 22 in and are supported by an insulated support 24 in parallel spaced relation with first set of conductive members 16 intermeshed with second set of conductive members 20.

A tuner 26 is provided for selectively tuning ionization assembly 12. Referring to FIG. 1, this produces an electric field with the characteristic ionizing energy value required to selectively ionize a selected contaminant 28 with minimal effect on other contaminants 30 in a gas stream 32.

A collector assembly, generally indicated by reference numeral 34, is provided for capturing selected contaminant 28 after ionization. Collector assembly 34 includes a charged metal substrate 36, such as a plate or mesh grid. Charged metal substrate 36 is charged with an electric charge having a different polarity to that of selected contaminant 28 after ionization. This causes selected contaminant 28 to be attracted to collector assembly 34. Charged metal substrate 36 is cooled below a characteristic liquifying temperature for selected contaminant 28, thereby liquifying selected contaminant 28. Charged metal substrate 36 is positioned at an angle, with a collection vessel 38 positioned beneath charged metal substrate 36, such that after liquefaction, selected contaminant 28 flows down charged metal substrate 36 into collection vessel 38. In the illustrated embodiment, metal substrate 36 is illustrated as being a plate, however, it will be appreciated that metal substrate 36 can be in other forms such as mesh and still operate.

A magnetic field generator 40 is provided for applying a magnetic field 42 to deflect selected contaminant 28 to collector assembly 34. Magnetic field 42 is applied at an angle to the motion of selected contaminant 28 to deflect selected contaminant 28 along an arcuate path 44 to collector assembly 34 which can be predetermined based upon known data regarding mass and average drift velocity of selected contaminant 28.

Figure 2:
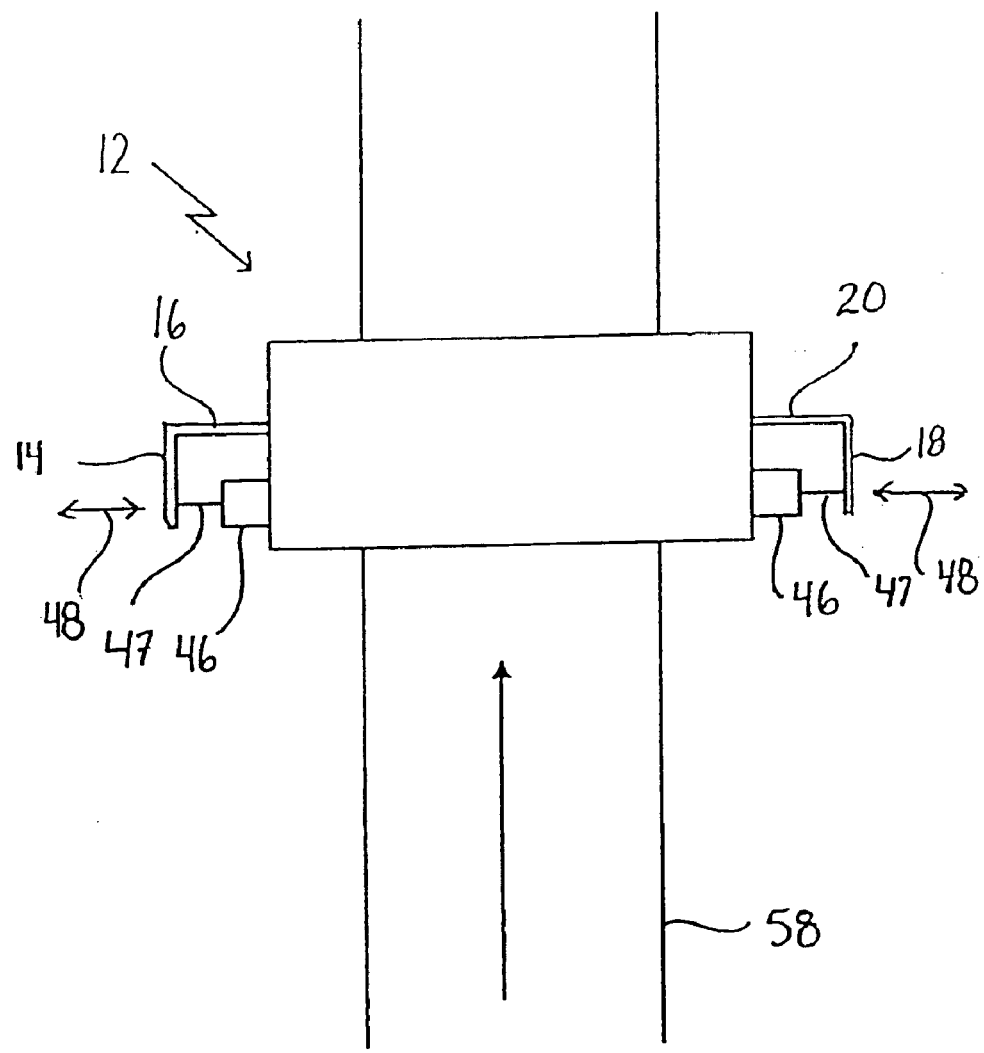
FIG. 2 is a side elevation view of an ionization assembly from the apparatus for removing contaminants from gas streams illustrated in FIG. 1.
Figure 4:
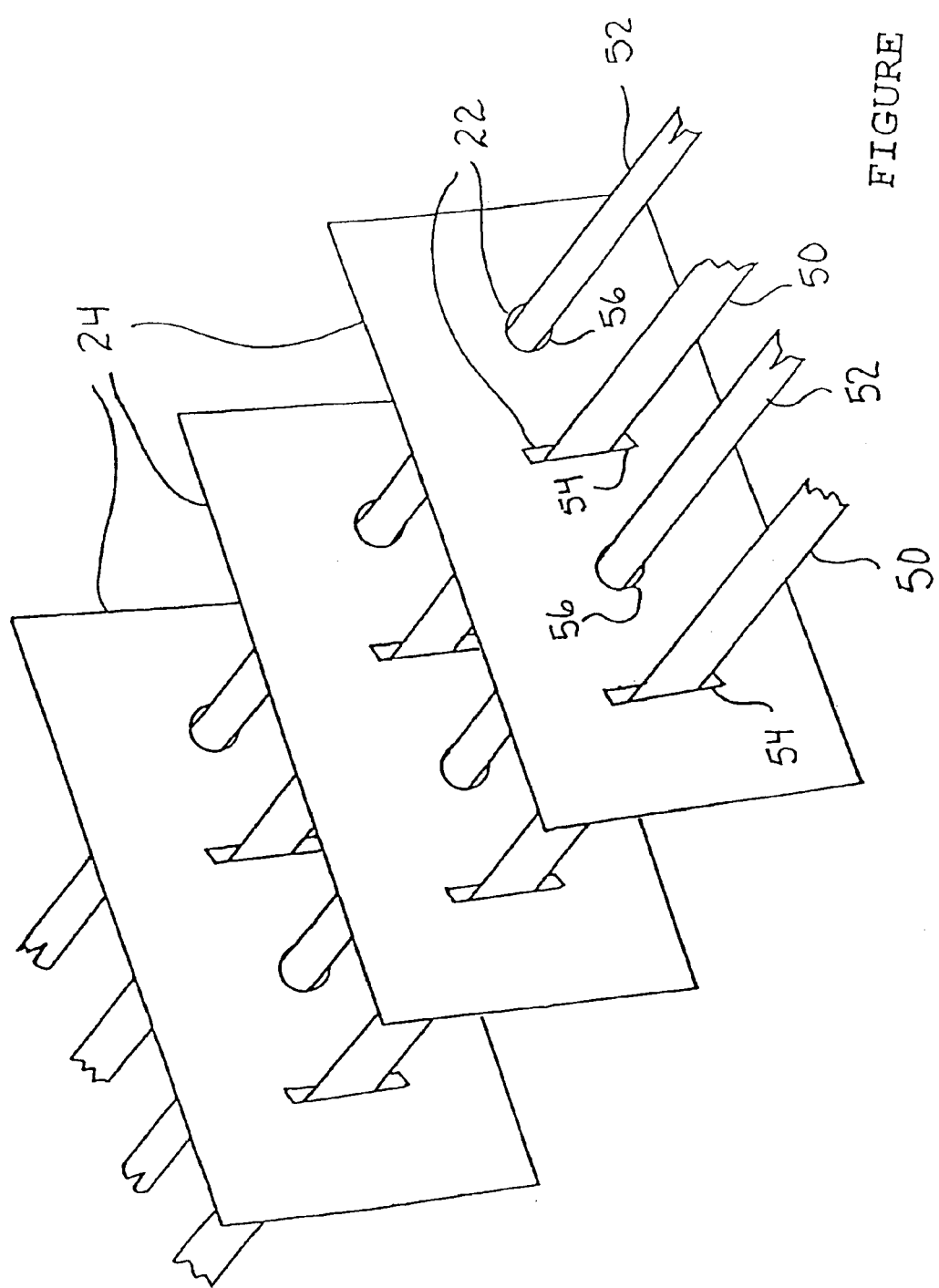
FIG. 4 is a detailed perspective view of the internal structure of the ionization assembly illustrated in FIG. 2.

Referring to FIG. 2, a drive motor 46 with a reciprocating shaft 47 is provided as means to effect relative movement of first body 14 and second body 18 toward and away from each other as indicated by arrows 48. When drive motor 46 is activated, reciprocating shaft 47 extends to move first body 14 and second body 18 away from each other and then reciprocating shaft 47 retracts to move first body 14 and second body 18 toward each other. This serves to clean first set of conductive members 16 and second set of conductive members 20, as will hereinafter be further described. Referring to FIGS. 3 and 4, first set of conductive members 16 and second set of conductive members 20 include blades 50 and rods 52. Referring to FIG. 4, blades 50 and rods 52 extend through openings 22 in insulating support 24. In the illustrated embodiment, openings 22 are illustrated as being slots 54 and round apertures 56 so as to accommodate blades 50 and rods 52. As first body 14 and second body 18 are moved toward and away from each other, blades 50 and rods 52 of first set of conductive members 16 and second set of conductive members 20 move through slots 54 and round apertures 56 of insulating support 24. As blades 50 and rods 52 move back and forth through slots 54 and round apertures 56, respectively, they rub against insulating support 24. This rubbing action serves to clean first set of conductive members 16 and second set of conductive members 20.

Operation:

Referring to FIGS. 1 and 3, the preferred method for removing contaminants from gas streams 32 using apparatus 10 will now be described. Sulphur compounds will be used as an example of a contaminant 28 which can be removed using the teachings of the present method.

A first step involves selecting a contaminant 28 to be removed from gas stream 32. In the illustrated embodiment, gas stream 32 is passing up through an exhaust chimney 58. In this example we are selecting sulphur compounds. Various industries, such as pulp and paper, have gaseous emissions which include sulphur compounds. These sulphur compounds result, even when less than one percent of the emissions, in unpleasant odours. Beyond the presence of unpleasant odours, some persons experience allergic reactions when sulphur compounds are present in emissions. A characteristic ionizing energy value required to selectively ionize a given sulphur compound with minimal effect on other contaminants 30 in gas stream 32 is then determined. The research and experiments of Franck-Hertz serve as a basis for determining this characteristic ionizing energy value. It is preferred that the minimum resonance voltage be applied for best results, as such minimum resonance voltages can be more readily "tuned" to ionize the sulphur compounds without effecting other contaminants.

Electric field 42 with the characteristic ionizing energy value is applied to gas stream 32 and selectively ionizes selected contaminant 28. Selected contaminant 28 is captured after ionization by applying magnetic field 42 at an angle to the motion of selected contaminant 28 to deflect selected contaminant 28 along arcuate path 44. Arcuate path 44 can be predetermined based upon known data regarding mass and average drift velocity of selected contaminant 28 to collector assembly 34. The motion of the ionized molecules which comprise selected contaminant 28 can be controlled by applying uniform magnetic field 42. Magnetic field 42 can be supplied using a set of permanent magnets or a set of electromagnetic coils. For example, if magnetic field 42 is applied at a 90 degree angle with respect to the direction of the motion, it will deflect selected contaminant 28 by a force, $F_{mag}$, which makes 90 degree angle to both magnetic field 42 and velocity. This forces the ionized molecule to move on arcuate path 44. The radius of arcuate path 44 can be calculated as follows:

$F_{mag}$=q v×B=nevB where: n=1 for singly charged ion, e is the charge per one electron, v is the velocity and B is the magnetic field.

$F_{centripetal}$=[m $v^2$]/R

Now $F_{mag}$=$F_{centripetal}$

Therefore, R=[m $v^2$]/evB=[mv]/eB

So by knowing the mass per each molecule "m" and the average drift velocity and magnetic field 42, it can be predetermined where the selected contaminant will land and be collected.

Charged metal substrate 36 is cooled below a characteristic liquifying temperature for selected contaminant 28, thereby liquifying selected contaminant 28. By having charged metal substrate 36 positioned at an angle, after liquefaction, selected contaminant 28 flows down charged metal substrate 36 into collection vessel 38 positioned beneath charged metal substrate 36.

Referring to FIGS. 2 and 3 first body 14 and second body 18 can be moved toward and away from each other by activating drive motor 46. As first body 14 and second body 18 are moved toward and away from each other first set of conductive members 16 and second set of conductive members 20 are pulled back and forth in openings 22 of insulated support and rub against insulated support 24. This serves to clean first set of conductive members 16 and second set of conductive members 20. With periodic cleaning, first conductive members 16 and second conductive 20 members maintain longer operational intervals between servicing, without short circuiting or sparking due to dust accumulations.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiment of the invention in which an exclusive property or privilege is claimed are defined as follows:

1. An apparatus for removing contaminants from gas streams, comprising:
   an ionization assembly;
   a tuner for selectively tuning the ionization assembly to produce an electric field having a characteristic ionizing energy value required to selectively ionize a selected contaminant with minimal affect on other contaminants in a gas stream;
   a collector assembly for capturing the selected contaminant after ionization, the collector assembly including a charged metal substrate cooled below a characteristic liquefying temperature for the selected contaminant, thereby liquefying the selected contaminant.

2. The apparatus as defined in claim 1, wherein a magnetic field generator is provided for applying a magnetic field to deflect the selected contaminant to the collector assembly, the magnetic field being applied at an angle to the motion of the selected contaminant to deflect the selected contaminant along an arcuate path to the collector which can be predetermined based upon known data regarding mass and average drift velocity of the selected contaminant.

3. The apparatus as defined in claim 1, the collector assembly being charged with an electric charge having a different polarity to that of the selected contaminant after ionization, whereby the selected contaminant is attracted to the collector assembly.

4. The apparatus as defined in claim 1, the charged metal substrate being positioned at an angle, with a collection vessel being positioned beneath the charged metal substrate, such that after liquefaction the selected contaminant flows down the charged metal substrate into the collection vessel.

5. An apparatus for removing contaminants from gas streams, comprising:
   an ionization assembly;
   a tuner for selectively tuning the ionization assembly to produce en electric field having a characteristic ionizing energy value required to selectively ionize a selected contaminant with minimal effect on other contaminants in a gas stream;
   a collector assembly for capturing the selected contaminant after ionization; the ionization assembly including a first body having a first set of conductive members, a second body having a second set conductive members, the first body and the second body extending through openings of an insulated, support in parallel spaced relation, the first set of conductive members being intermeshed with the second set of conductive members.

6. The apparatus as defined in claim 5, means being provided to effect relative movement of the first body and the second body toward and away from each other, thereby cleaning the first set of conductive members and the second set of conductive members by rubbing them against the insulated support.

7. An apparatus for removing contaminants from gas streams, comprising:
   an ionizing assembly including a first body having a first set of conductive members, the first body and the second body extending through openings in and being supported by an insulated support in parallel spaced relation, the first set of conductive members bing intermeshed with the second set of conductive members;
   a tuner for selectively tuning the ionization assembly to produce an electric field having a characteristic ionizing energy value required to selectively ionize a selected contaminant with minimal effect on other contaminants in a gas stream;
   a collector assembly for capturing the selected contaminant after ionization, the collector including a charged metal substrate with an electric charge having a different polarity to that of the selected contaminant after ionization, whereby the selected contaminant is attracted to the collector assembly, the charged metal substrate being cooled below a characteristic liquefying temperature for the selected contaminant, thereby liquefying the selected contaminant, the charged metal substrate being positioned at an angle, with a collection vessel being positioned beneath the charged metal substrate, such that after liquefaction the selected contaminant flows down the charged metal substrate into the collection vessel; and
   a magnetic field generator for applying a magnetic field to deflect the selected contaminant to the collector, the magnetic field being applied at an angle to the motion of the selected contaminant to deflect the selected contaminant along an arcuate path to the collector which can be predetermined based upon known data regarding mass and average drift velocity of the selected contaminant.

8. The apparatus as defined in claim 7, means being provided to effect relative movement of the first body and the second body toward and away from each other, thereby cleaning the first set of conductive members and the second set of conductive members by rubbing them against the insulated support.

* * * * *